US009234987B2

(12) United States Patent
Wang et al.

(10) Patent No.: US 9,234,987 B2
(45) Date of Patent: Jan. 12, 2016

(54) WIDE-VIEW MULTILAYER OPTICAL FILMS

(71) Applicant: AKRON POLYMER SYSTEMS, INC., AKRON, OH (US)

(72) Inventors: Bin Wang, Kingsport, TN (US); Ted Calvin Germroth, Kingsport, TN (US); Thauming Kuo, Kingsport, TN (US); Frank W. Harris, Boca Raton, FL (US); Dong Zhang, Uniontown, OH (US); Douglas S. McWilliams, Piney Flats, TN (US); Jiaokai Jing, Uniontown, OH (US); Xiaoliang Zheng, Hudson, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 373 days.

(21) Appl. No.: 13/667,219

(22) Filed: Nov. 2, 2012

(65) Prior Publication Data

US 2014/0126055 A1 May 8, 2014

Related U.S. Application Data

(63) Continuation-in-part of application No. 12/890,011, filed on Sep. 24, 2010, now Pat. No. 8,802,238.

(51) Int. Cl.
*G02B 1/08* (2006.01)
*G02B 5/30* (2006.01)

(52) U.S. Cl.
CPC .......................... *G02B 1/08* (2013.01)

(58) Field of Classification Search
CPC ........... G02B 1/08; G02B 5/3083; G02B 5/32
USPC ............... 359/489.07; 428/422; 349/117, 118
See application file for complete search history.

(56) References Cited

U.S. PATENT DOCUMENTS 4,505,543 A 3/1985 Ueba et al.
6,519,016 B1 * 2/2003 Ichihashi et al. ............. 349/117
(Continued)

FOREIGN PATENT DOCUMENTS

CN 1115864 A 1/1996
TW 200821351 A 5/2008

*Primary Examiner* — Frank Font
(74) *Attorney, Agent, or Firm* — Benesch Friedlander Coplan & Aronoff LLP

(57) ABSTRACT

A multilayer optical film includes a wave plate having a refractive index profile of $n_x > n_y \geq n_z$ and a fluoropolymer film comprising a moiety of

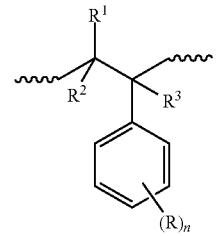

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is each independently a substituent on the styrenic ring, n is an integer from 0 to 5 representing the number of the substituents on the styrenic ring, and wherein $n_x$ and $n_y$ represent in-plane refractive indices and $n_z$ the thickness-direction refractive index of the wave plates; wherein said multilayer optical film has a positive in-plane retardation ($R_e$) and an out-of-plane retardation ($R_{th}$) that satisfies the equation of $|R_{th}| < R_e/2$ throughout the wavelength range of 400 nm to 800 nm.

27 Claims, 4 Drawing Sheets

(56) References Cited

U.S. PATENT DOCUMENTS

| | | | |
|---|---|---|---|
| 7,099,083 B2* | 8/2006 | Johnson et al. | 359/489.07 |
| 7,211,304 B2 | 5/2007 | Elman et al. | |
| 7,211,316 B2 | 5/2007 | Ishikawa et al. | |
| 7,339,736 B2* | 3/2008 | Trapani et al. | 359/487.02 |
| 8,767,297 B2* | 7/2014 | Chae et al. | 359/489.07 |
| 8,802,238 B2* | 8/2014 | Zheng et al. | 428/422 |
| 2005/0163958 A1 | 7/2005 | Nakatsugawa | |
| 2005/0270458 A1 | 12/2005 | Ishikawa et al. | |
| 2007/0046870 A1 | 3/2007 | Murakami et al. | |
| 2007/0087132 A1 | 4/2007 | Greener | |
| 2007/0177087 A1 | 8/2007 | Kawahara et al. | |
| 2009/0068380 A1 | 3/2009 | Zheng et al. | |
| 2010/0072880 A1 | 3/2010 | Adachi et al. | |
| 2011/0076487 A1 | 3/2011 | Zheng et al. | |
| 2011/0194048 A1* | 8/2011 | Izaki et al. | 349/62 |
| 2012/0003403 A1 | 1/2012 | Wang et al. | |
| 2014/0240830 A1* | 8/2014 | Chae et al. | 359/489.07 |

* cited by examiner

WIDE-VIEW MULTILAYER OPTICAL FILMS

FIELD

This invention pertains to a multilayer optical film whose out-of-plane retardation has been reduced to provide a wide viewing characteristic. More specifically, this invention relates to a wide-view optical film comprising a positive in-plane birefringent film and a fluoropolymer film. The optical film of the invention can be used in an optical device such as liquid crystal display, OLED display, 3D glasses, optical switch, or waveguide where a controlled light management is desirable.

BACKGROUND

An A-plate is a wave plate commonly used as a retarder in an optical device. It is a birefringent material capable of manipulating the polarization state or phase of the light beam traveling through the medium. The A-plate optical retarder has a refractive index profile of $n_x>n_y=n_z$, wherein $n_x$ and $n_y$ represent in-plane refractive indices and $n_z$ the thickness-direction refractive index. Such a wave plate exhibits a positive in-plane retardation ($R_e$) as expressed by $R_e=(n_x-n_y)\times d$, wherein d is the thickness of the wave plate.

An A-plate having in-plane retardation ($R_e$) equal to a quarter of a light wavelength ($\lambda$), $R_e=\lambda/4$, is called quarter wave plate (QWP). Likewise, an A-plate having $R_e$ equal to half of the wavelength, $R_e=\lambda/2$, is called half wave plate (HWP). A QWP is capable of converting an incident linearly polarized light to circularly polarized light. Thus, it is commonly used in combination with a linear polarizer to provide a circular polarizer in an optical device. An HWP is capable of rotating the plane of polarization by $2\theta$, where $\theta$ is the angle of the plane polarized light with respect to the slow (or fast) axis of the wave plate.

A-plates are commonly used in liquid crystal displays (LCDs) as compensation films to improve the viewing angles. They can also be used in an OLED (organic light emitting diode) display device. For example, A QWP is being used with a linear polarizer to provide a circular polarizer in an OLED device to reduce the ambient light reflected by OLED for improved viewing quality. These applications typically utilize the in-plane retardation provided by the A-plate for in-plane phase-shift compensation. For example, A-plate combining with C-plate is particularly useful in reducing light leakage of the crossed polarizers at oblique viewing angles. The A-plate, however, also exhibits a negative out-of-plane retardation $R_{th}$, which is defined as $R_{th}=[n_z-(n_x+n_y)/2]\times d$ with a value of $|R_e/2|$ arising from its orientation. This characteristic can be beneficial when a negative $R_{th}$ is desirable in an optical device. For example, in a vertically aligned (VA) mode LCD, the liquid crystal molecules in the LC cell are aligned in a homeotropic manner, which results in positive out-of-plane retardation. An A-plate, thus, can provide an out-of-plane compensation in addition to in-plane compensation in VA-LCD. In other devices, such as in-plane switch (IPS) mode LCD and OLED display, however, the $R_{th}$ exhibited in the A-plate is not desirable since it can give rise to phase shift in off-axis light and lead to light leakage. Thus, there exists a need in the art to provide a positive in-plane retarder having reduced out-of-plane retardation for improved viewing angle and contrast ratio of the display.

U.S. Pat. No. 7,211,316 discloses an optical multilayer comprising a polymeric substrate and an amorphous polymer having Tg above 160° C. and positive birefringence so as to provide a total out-of-plane phase retardation of said multilayer of between −30 nm and 30 nm.

SUMMARY

This invention provides a multilayer optical film comprising,
(a) a wave plate having a refractive index profile of $n_x>n_y \geq n_z$ and
(b) a fluoropolymer film comprising a moiety of

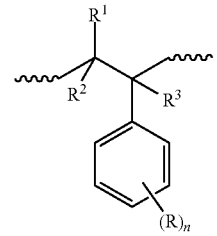

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is each independently a substituent on the styrenic ring, n is an integer from 0 to 5 representing the number of the substituents on the styrenic ring, and wherein $n_x$ and $n_y$ represent in-plane refractive indices and $n_z$ the thickness-direction refractive index of the wave plates; wherein said multilayer optical film has a positive in-plane retardation ($R_e$) and an out-of-plane retardation ($R_{th}$) that satisfies the equation of $|R_{th}|<R_e/2$ throughout the wavelength range of about 400 nm to about 800 nm.

In one aspect, the multilayer optical film in accordance with the present invention has an out-of-plane retardation ($R_{th}$) that satisfies the equation of $|R_{th}|<100$ nm, or <50 nm, or <30 nm, or <10 nm, or <5 nm throughout the wavelength range of about 400 nm to about 800 nm.

In another aspect, the multilayer optical film of the invention is a quarter wave plate (QWP) having $R_3=\lambda/4$ and $|R_{th}|<R_e/2$ or a half wave plate (HWP) having $R_e=\lambda/2$ and $|R_{th}|<R_e/2$.

The multilayer optical film of this invention can be used in a liquid crystal display device including an in-plane switching liquid crystal display device, in an OLED display device, in a circular polarizer, or in 3D glasses. Said display devices may be used for television, computer, cell phone, camera, and the like.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
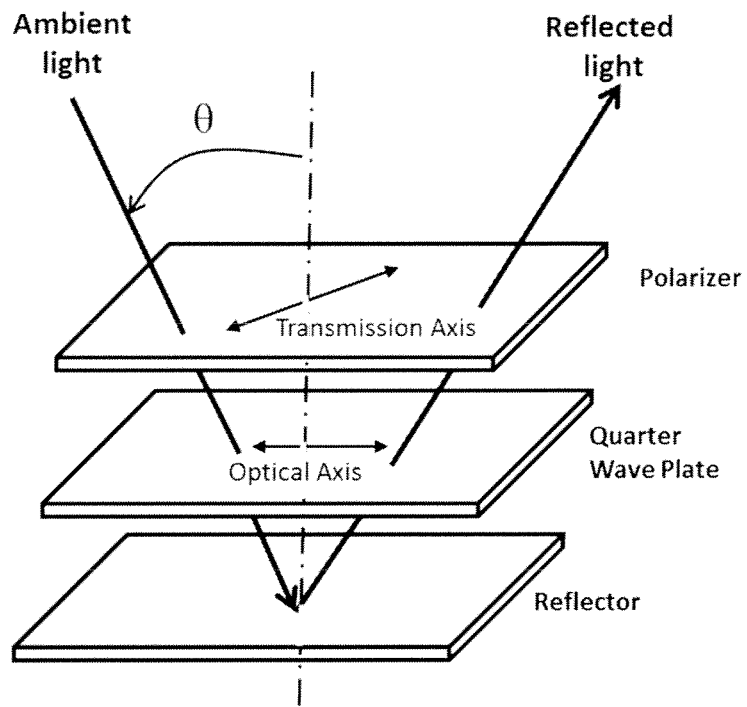
FIG. 1 is a schematic view illustrating a stacking pattern in which a quarter wave plate is sandwiched between a linear polarizer and a reflector.

In one embodiment of the present invention, there is provided a multilayer optical film comprising, (a) a wave plate having a refractive index profile of $n_x > n_y \geq n_z$ and (b) a fluoropolymer film comprising a moiety of

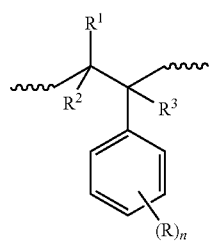

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is, each independently, a substituent on the styrenic ring, n is an integer from 0 to 5 representing the number of the substituents on the styrenic ring, and wherein $n_x$ and $n_y$ represent in-plane refractive indices and $n_z$ the thickness-direction refractive index of the wave plates; wherein said multilayer optical film has a positive in-plane retardation ($R_e$) and an out-of-plane retardation ($R_{th}$) that satisfies the equation of $|R_{th}| < R_e/2$ throughout the wavelength range of about 400 nm to about 800 nm.

In one aspect, at least two of $R^1$, $R^2$, and $R^3$ are fluorine atoms; in another aspect, $R^1$, $R^2$, and $R^3$ are all fluorine atoms.

Examples of the substituent R on the styrenic ring include alkyl, substituted alkyl, halogen hydroxyl, carboxyl, nitro, alkoxy, amino, sulfonate, phosphate, acyl, acyloxy, phenyl, alkoxycarbonyl, cyano, and the like.

Retardation (R) of a wave plate is defined as $R = \Delta n \times d$, wherein $\Delta n$ is the birefringence and d is the thickness of the wave plate. Birefringence is classified into in-plane birefringence $\Delta n = n_x - n_y$, and out-of-plane birefringence $\Delta n = n_z - (n_x + n_y)/2$. Thus, in-plane retardation is represented by $R_e = (n_x - n_y) \times d$, and out-of-plane retardation, $R_{th} = [n_z - (n_x + n_y)/2] \times d$.

Birefringence ($\Delta n$) of a wave plate may be measured by determining the birefringence of a wave plate over a wavelength range of about 400 nm to about 800 nm at different increments. Alternatively, birefringence may be measured at a specific light wavelength. When the values of the birefringence or retardation are compared as described in this invention, they are meant to be compared at the same wavelength throughout out the wavelength range of about 400 nm to about 800 nm.

In a further aspect, the multilayer optical film in accordance with the present invention has an out-of-plane retardation ($R_{th}$) that satisfies the equation of $|R_{th}| < 100$ nm, or $<50$ nm, or $<30$ nm, or $<10$ nm, or $<5$ nm, or $30$ nm$<|R_{th}|<100$ nm throughout the wavelength range of about 400 nm to about 800 nm.

The wave plate in (a) may be either an A-plate having $n_x > n_y = n_z$ or a biaxial wave plate having $n_x > n_y > n_z$, which can be made of inorganic crystals, such as quartz, calcite, lithium niobate, and magnesium fluoride, or polymer films. Examples of polymer films are polycarbonate, cyclic olefin polymer (COP), polyester, cellulose ester, polyacrylate, polyolefin, polysulfone, and polyurethane.

The wave plate in (a) may be a quarter wave plate (QWP) having in-plane retardation ($R_e$) equal to a quarter of a light wavelength ($\lambda$), $R_e = \lambda/4$, or a half wave plate (HWP) having $R_e = \lambda/2$. The QWP may be a broadband QWP having $R_e$ equal to about $\lambda/4$ at each wavelength ranging from about 400 nm to about 800 nm. Likewise, the HWP may be a broadband HWP having $R_e = \lambda/2$ at each wavelength. An example of the QWP is a wave plate having in-plane retardation ($R_e$) of about 120-160 nm at the wavelength ($\lambda$) 560 nm.

The fluoropolymer film of (b) can be prepared by solution cast using polymer solution or melt extrusion using polymer melt.

In one embodiment, the fluoropolymer film is a coating film having been cast on a substrate from a solution comprising a fluoropolymer and a solvent. The solution-cast polymer film is capable of forming an out-of-plane anisotropic alignment (positive C-plate) upon solvent evaporation without being subject to heat treatment, photo irradiation, or stretching, and has a positive out-of-plane birefringence greater than about 0.005, greater than about 0.01, or greater than about 0.015 throughout the wavelength range of 400 nm$<\lambda<800$ nm.

In another embodiment, the solution-cast fluoropolymer film is removed from the substrate upon drying to yield a free-standing film. The free-standing film, prepared either by solution cast or melt extrusion, can be attached to the wave plate of (a) by lamination. Alternatively, the fluoropolymer film on the substrate is laminated onto the wave plate of (a) and the substrate subsequently removed. The thickness of the fluoropolymer film in (b) as a laminated film can be from about 3 to about 150 μm, or, in another embodiment, from about 10 to about 100 μm.

In a further aspect, the fluoropolymer film is cast directly onto the wave plate of (a) from the polymer solution to yield a coating film.

In yet another aspect, the solution-cast fluoropolymer film may be further stretched uniaxially or biaxially by a method known in the art to yield an in-plane retardation satisfying the equation of $|n_x - n_y| > 0.001$, wherein $n_x$ and $n_y$ are in-plane refractive indices of the film. Stretching can be done by using either a free-standing film or a film on a carrier substrate. The stretched fluoropolymer film thus obtained can then be laminated to the wave plate of (a) by itself or with the substrate, which is subsequently removed.

A unique feature of the present invention is its ability to provide a multilayer optical film with a low out-of-plane retardation ($R_{th}$) value. The low $R_{th}$ is desirable particularly for display application since it can increase the viewing angle and improve the contrast ratio of an image. This is made possible by the high, positive $R_{th}$ characteristic of the fluoropolymer film of (b), which enables the reduction or elimination of the negative $R_{th}$ typically exhibited in the wave plate of (a) with a thin coating film. The thickness of the fluoropolymer film in (b) as a coating can be from about 2 to about 20 μm, or, in another embodiment, from about 3 to about 10 μm.

The multilayer optical film of the present invention may be a quarter wave plate (QWP) having $R_e = \lambda/4$ and $|R_{th}| < R_e/2$ or a half wave plate (HWP) having $R_e = \lambda/2$ and $|R_{th}| < R_e/2$. In one embodiment, this invention provides a multilayer optical film having an in-plane retardation ($R_e$) of about 120-160 nm at the wavelength ($\lambda$) 560 nm. In another embodiment, the multilayer optical film has an in-plane retardation ($R_e$) of about 120-160 nm at the wavelength ($\lambda$) 560 nm and an out-of-plane retardation ($R_{th}$) that satisfies the equation of $|R_{th}| < 30$ nm.

The QWP may be a broadband QWP having $R_e$ equal to about $\lambda/4$ at each wavelength ranging from about 400 nm to about 800 nm. Likewise, the HWP may be a broadband HWP having $R_e = \lambda/2$ at each wavelength. In a further aspect, this invention provides a multilayer optical film, which has an in-plane retardation ($R_e$) equal to about $\lambda/4$ at each wavelength ranging from 400 nm to 800 nm and an out-of-plane retardation ($R_{th}$) that satisfies the equation of $|R_{th}| < 30$ nm.

The QWP may be combined with a linear polarizer to yield a circular polarizer. Thus, this invention further provides a circular polarizer comprising a linear polarizer and a QWP of the present invention. In another embodiment, there is provided an OLED display comprising a circular polarizer of the present invention.

The casting of a polymer solution onto a substrate may be carried out by a method known in the art such as, for example, spin coating, spray coating, roll coating, curtain coating, or dip coating. Substrates are known in the art, which include triacetylcellulose (TAC), cyclic olefin polymer (COP), polyester, polyvinyl alcohol cellulose ester, cellulose acetate propionate (CAP), polycarbonate, polyacrylate, polyolefin, polyurethane, polystyrene, glass, and other materials commonly used in an LCD device.

Depending on the composition, the fluoropolymer of the present invention may be soluble in, for example, toluene, methyl isobutyl ketone, cyclopentanone, methylene chloride, chloroform, 1,2-dichloroethane, methyl amyl ketone, methyl ethyl ketone, methyl isopropyl ketone, methyl isoamyl ketone, ethyl acetate, n-butyl acetate, propylene glycol ethyl ether acetate, and a mixture thereof.

The fluoropolymer film of the present invention may be a homopolymer or a copolymer. The homopolymer may be prepared by polymerization of a fluorine-containing monomer having the structures below:

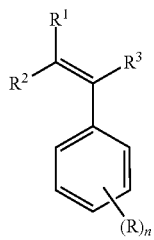

wherein $R^1$, $R^2$, and $R^3$ are each independently hydrogen atoms, alkyl groups, substituted alkyl groups, or halogens and wherein at least one of $R^1$, $R^2$, and $R^3$ is a fluorine atom, wherein R is, each independently, a substituent on the styrenic ring, n is an integer from 0 to 5 representing the number of the substituents on the styrenic ring.

Examples of such fluorine-containing monomers include, but not limited to, $\alpha,\beta,\beta$-trifluorostyrene, $\alpha,\beta$-difluorostyrene, $\beta,\beta$-difluorostyrene, $\alpha$-fluorostyrene, and $\beta$-fluorostyrene. In one embodiment the homopolymer is poly($\alpha,\beta,\beta$-trifluorostyrene).

The copolymer may be prepared by copolymerization of one or more of the fluorine-containing monomers with one or more of ethylenically unsaturated monomers. Examples of ethylenically unsaturated monomers include, but not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, $\alpha$-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, $C_1$-$C_{18}$ alkyl crotonates, di-n-butyl maleate, di-octyl-maleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N. H., and in Polymers and Monomers, the 1966-1997 Catalog from Polyscience, Inc., Warrington, Pa., U.S.A.

In one embodiment, the fluoropolymer is a copolymer of $\alpha,\beta,\beta$-trifluorostyrene with one or more of ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, $\alpha$-methyl styrene, 4-methylstyrene, vinyl biphenyl, acrylonitrile, and isoprene.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is one method of polymerization when a particularly high molecular weight is desirable. A high molecular weight polymer may lead to better film quality and higher positive birefringence. Methods for the preparation of homopolymers and copolymers of monofluoro, difluoro, and trifluorostyrene can be found in *Progress in Polymer Science*, Volume 29 (2004), pages 75-106, Elsevier Ltd., Mo., USA, the content of which is incorporated herein by reference.

Solution film casting may be conducted with a fluoro-homopolymer solution, a solution comprising a blend of fluoro-homopolymer and other polymers, or a fluoro-copolymer. Polymer solutions may further contain other ingredients such as other polymers or additives. Plasticizers are common additives used for film formation to improve film properties.

Examples of the plasticizers suitable for this invention include those available from Eastman Chemical Company:

Abitol E (hydrogenated gum rosin), Permalyn 3100 (tall oil rosin ester of pentaerythritol), Permalyn 2085 ((tall oil rosin ester of glycerol), Permalyn 6110 (gum rosin ester of pentaerythritol), Foralyn 110 (hydrogenated gum rosin ester of pentaerythritol), Admex 523 (a dibasic acid glycol polyester), and Optifilm Enhancer 400 (a proprietary low VOC, low odor coalescent); those available from Unitex Chemical Corp.: Uniplex 552 (pentaerythritol tetrabenzoate), Uniplex 280 (sucrose benzoate), and Uniplex 809 (PEG di-2-ethylhexoate); triphenylphosphate, tri(ethylene glycol)bis(2-ethylhexanoate), tri(ethylene glycol)bis(n-octanoate), and a mixture thereof.

In another embodiment, the fluoropolymer solution further comprises one or more of the plasticizers selected from the group consisting of triphenylphosphate, tri(ethylene glycol) bis(2-ethylhexanoate), tri(ethylene glycol)bis(n-octanoate); Optifilm Enhancer 400, Abitol E, and Admex 523 available from Eastman Chemical Company; Uniplex 552, Uniplex 809, and Uniplex 280 available from Unitex Chemical Corp.

The multilayer optical film of the present invention may be used in a liquid crystal display device including an in-plane switching liquid crystal display device, in an OLED display device in a circular polarizer, or in 3D glasses. Said display devices may be used for television, computer, cell phone, camera, and the like.

EXAMPLES

Method

The optical simulation program employed is written in computer language MATLAB® based on the 4×4 matrix method, which deals with multilayer optical structure for viewing angle and contrast ratio calculations. The program is utilized to determine light leakage in an optical device having a QWP sandwiched between a linear polarizer and a reflector. As illustrated in FIG. 1, the optical axis of the QWP is aligned at 45° angle with respect to the transmission axis of the polarizer. As is known in the art, when the linearly polarized light passed through a QWP, it becomes a circularly polarized light. The one handedness circularly polarized light is then reflected by the reflector and rotated to the other handedness direction. When the reflected light passes through the QWP, it becomes a linearly polarized light again but is now perpendicular to the transmission axis of the polarizer. As a result, the incident ambient light is blocked. This is an ideal scenario. In practice, light leakage could still occur. The experiments described herein are aimed to compare the light leakages between two devices, in which a QWP is used with and without compensation.

Figure 2:
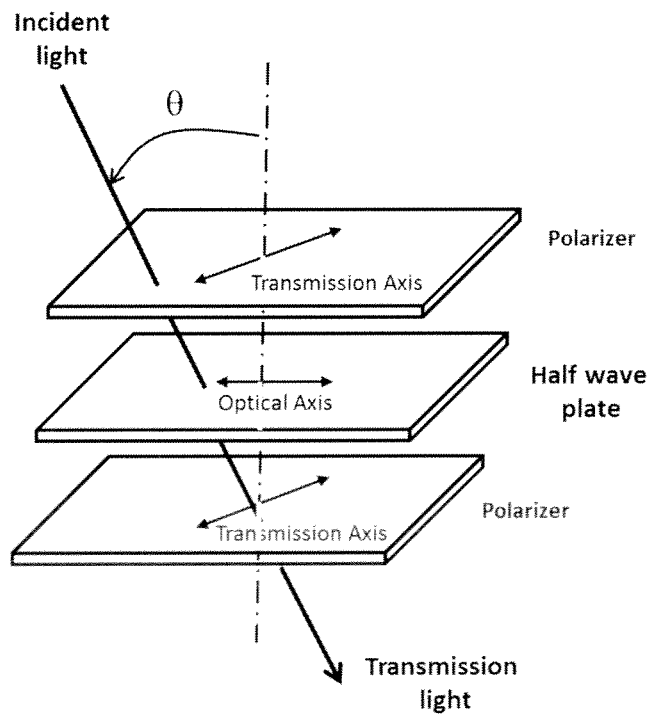
FIG. 2 is a schematic view illustrating a stacking pattern in which a half wave plate is sandwiched between two parallel linear polarizers.

The configuration shown in FIG. 1, however, is more difficult to be simulated due to the parameter selection of the reflector. An alternative configuration, as illustrated in FIG. 2, is thus used for the simulations described in the Examples. In this method, one half wave plate is used to represent the QWP in FIG. 1, where the light passes through twice. The HWP is placed between two parallel linear polarizers, in which the two transmission axes are at 0° angle. The optical axis of the HWP is aligned at a 45° angle with respect to the transmission axes of the polarizers. In such a configuration, it is known that the HWP will rotate the incident linearly polarized light by 90° and cause the light to be blocked by the second polarizer. Thus, this configuration will have the same optical effect as the reflective mode in FIG. 1.

Comparative Example 1

Figure 3:
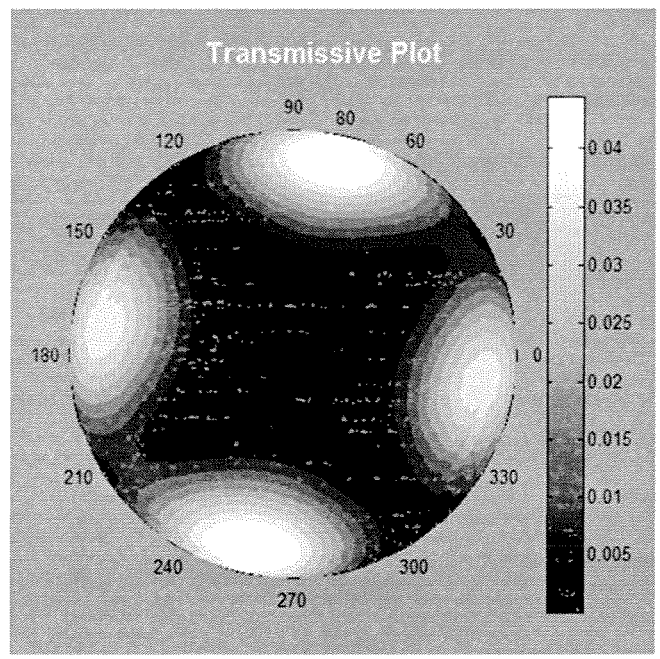
FIG. 3 is a contour plot showing the light leakage of the optical device provided in Comparative Example 1.

Computer Simulation of Light Leakage of an Optical Device Having Quarter Wave Plate Sandwiched Between Linear Polarizer and Reflector without Compensation In this simulation, a half wave plate with $R_e=275$ nm and $R_{th}=-137.5$ nm at $\lambda=550$ nm was used in FIG. 2 configuration (representing a QWP having $R_e=137.5$ nm and $R_{th}=-68.75$ nm in FIG. 1 configuration). The light leakage was determined, and the result is shown by the contour plot in FIG. 3. The minimum leakage was $2.68 \times 10^{-3}\%$ and the maximum 4.89%.

Example 1

Figure 4:
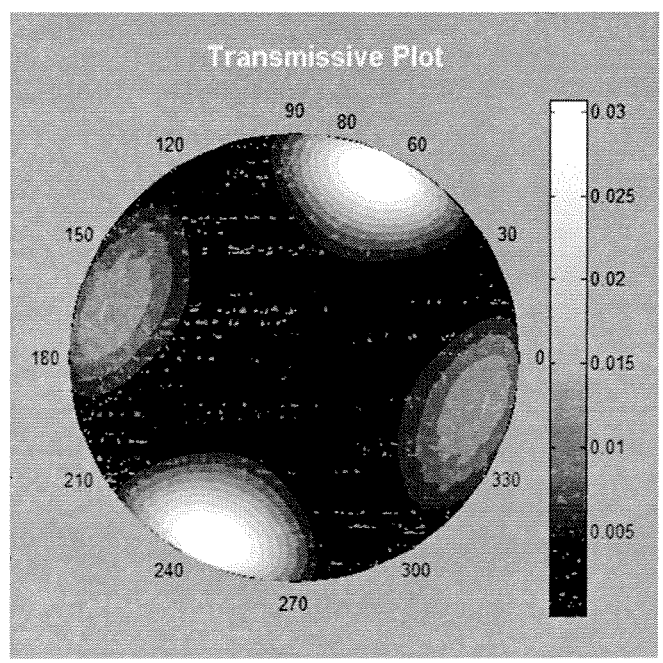
FIG. 4 is a contour plot showing the light leakage of the optical device provided in Example 1.

Computer Simulation of Light Leakage of an Optical Device Having Quarter Wave Plate Sandwiched Between Linear Polarizer and Reflector with Compensation In this simulation, the same half wave plate as in Comparative Example 1 was used. In addition, a positive C-plate having $R_{th}=137.5$ nm was used for compensation. The light leakage was determined accordingly. The result is shown in FIG. 4. The minimum leakage was $5.00 \times 10^{-3}\%$ and the maximum 3.37%.

Comparative Example 2

Figure 5:
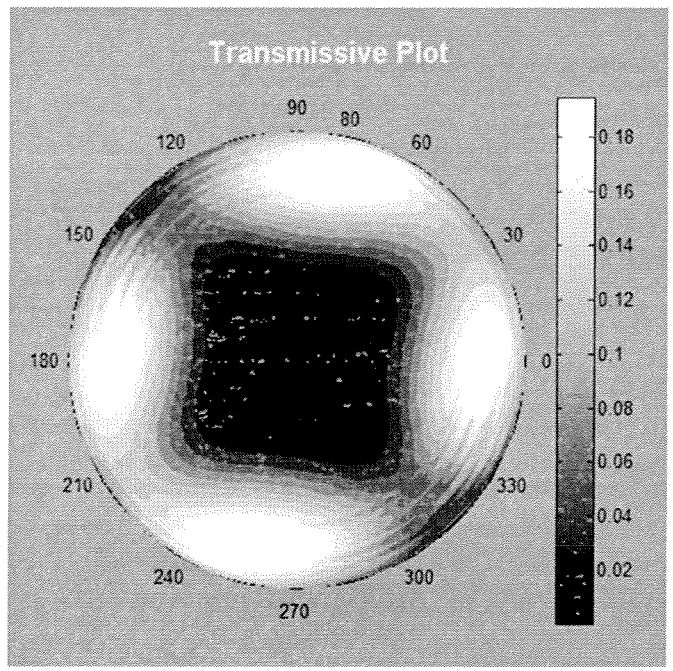
FIG. 5 is a contour plot showing the light leakage of the optical device provided in Comparative Example 2.

Simulation of Light Leakage of an Optical Device Having Biaxial Wave Plate Sandwiched Between Linear Polarizer and Reflector without Compensation In this simulation, a biaxial wave plate with $R_e=275$ nm and $R_{th}=-412.5$ nm at $\lambda=550$ nm was used in FIG. 5 configuration (representing a QWP having $R_e=137.5$ nm and $R_{th}=-206.25$ nm in FIG. 1 configuration). In this experiment, the slow axis of the biaxial wave plate was aligned at 45° angle with respect to the transmission axes of the polarizers. The light leakage was determined, and the result is shown by the contour plot in FIG. 5. The minimum leakage was $2.55 \times 10^{-3}\%$ and the maximum 21.4%.

Example 2

Figure 6:
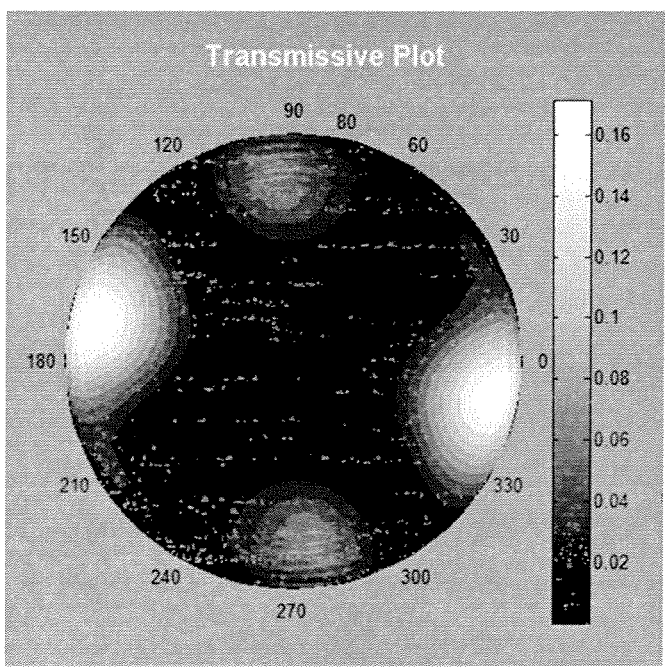
FIG. 6 is a contour plot showing the light leakage of the optical device provided in Example 2; and, FIG. 7 is a graph showing the retardations of a cellulose ester wave plate coated with fluoropolymer as described in Example 3.

Simulation of Light Leakage of an Optical Device Having Biaxial Film Sandwiched Between Linear Polarizer and Reflector with Compensation In this simulation, the same biaxial wave plate as in Comparative Example 2 was used. In addition, a positive C-plate having $R_{th}=412.5$ nm was used for compensation. The light leakage was determined accordingly. The result is shown in FIG. 6. The minimum leakage was $2.44 \times 10^{-3}\%$ and the maximum 17.1%.

Example 3

Out-of-Plane Retardation of Cellulose Ester Film Coated with Fluoropolymer

A solution of poly($\alpha,\beta,\beta$-trifluorostyrene) (PTFS) was prepared by mixing PTFS powder 10 g: intrinsic viscosity=1.0 dL/g) in the solvent, methyl isopropyl ketone (56.67 g). Separately, a sample (3 inch×4 inch) of a cellulose ester film having $R_e$=136 nm and $R_{th}$=−274 nm at λ=550 nm was prepared and treated with corona discharge using Laboratory Corona Treater (Model BD-20C; Electro-Technic Products, INC.) for about two minutes. The polymer solution was cast on the cellulose ester film (thickness, 70 μm) using a knife applicator. Immediately after casting, the coated film was placed in a force-air oven at 85° C. for 5 minutes to yield a dried coating. Two samples coated with PTFS were prepared; the thickness of the coatings was determined to be 16.2 μm (1) and 22.5 μm (2) respectively.

Figure 7:
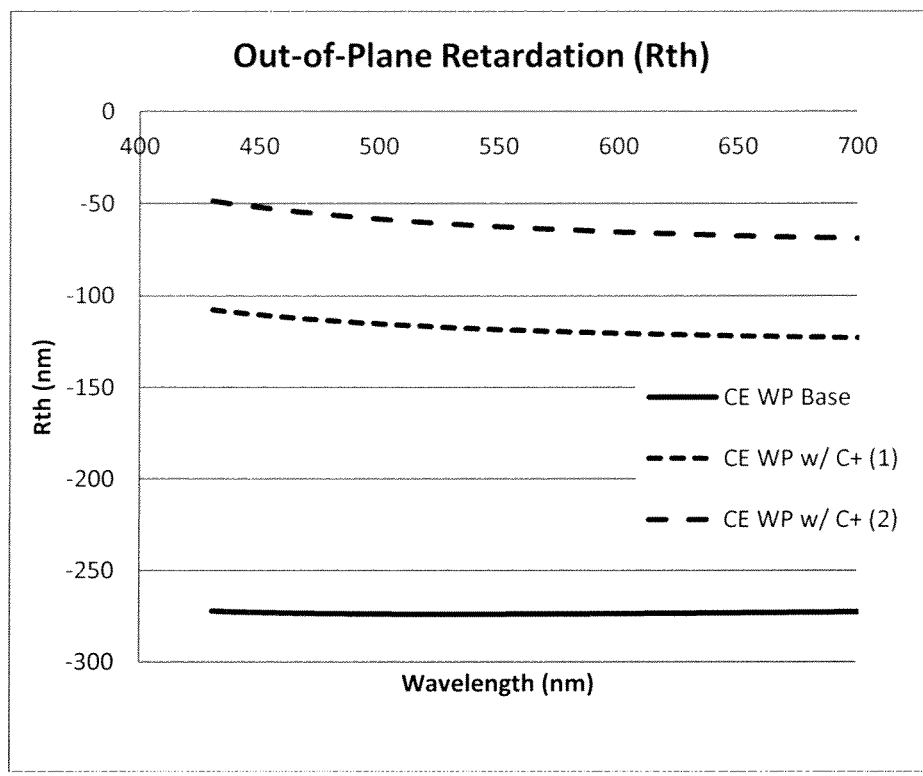

The thickness and the out-of-plane optical retardation ($R_{th}$) of the samples were measured. The thickness was measured by Metricon 2010 prism coupler, while the retardation by J. A. Woollam M-2000V. The retardations of the three samples, CE WP base, CE WP with C+ (1), and CE WP with C+ (2), were plotted against wavelength. As shown in FIG. 7, the cellulose ester films coated with PTFS had much reduced retardation values as compared to the cellulose ester film without PTFS coating.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the present embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A multilayer optical film comprising:
at least a first layer and a second layer, wherein the first layer comprises a wave plate having a refractive index profile of $n_x > n_y \geq n_z$; and, the second layer comprises a fluoropolymer comprising a moiety of

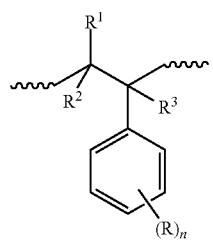

wherein $R^1$, $R^2$, and $R^3$ are each independently hydrogen atoms, alkyl groups, substituted alkyl groups, or halogens, wherein at least one of the $R^1$, $R^2$, and $R^3$ is a fluorine atom, wherein R is each independently a substituent on the styrenic ring, n is an integer from 0 to 5 representing the number of the substituents on the styrenic ring, and wherein $n_x$ and $n_y$ represent in-plane refractive indices and $n_z$ represents a thickness-direction refractive index of the wave plate;

wherein the multilayer optical film has a positive in-plane retardation ($R_e$) and an out-of-plane retardation ($R_{th}$) that satisfies the equation of $|R_{th}| < R_e/2$ throughout a wavelength range of 400 nm to 800 nm.

2. The multilayer optical film of claim 1, wherein the substituent R on the styrenic ring is selected from the group comprising alkyl, substituted alkyl, halogen, hydroxyl, carboxyl, nitro, alkoxy, amino, sulfonate, phosphate, acyl, acyloxy, phenyl, alkoxycarbonyl, and cyano.

3. The multilayer optical film of claim 1, wherein the wave plate is an A-plate having a refractive index profile of $n_x \geq n_y = n_z$.

4. The multilayer optical film of claim 1, wherein the wave plate is a quarter wave plate having in-plane retardation ($R_e$) of about 120-160 nm at wavelength (λ) 560 nm.

5. The multilayer optical film of claim 1, wherein the wave plate is a broadband quarter wave plate, having in-plane retardation equal to about λ/4 at each wavelength ranging from 400 to 800 nm.

6. The multilayer optical film of claim 1, wherein the wave plate is a biaxial wave plate having a refractive index profile of $n_x > n_y > n_z$.

7. The multilayer optical film of claim 1, wherein the wave plate is a polymer film selected from the group comprising polycarbonate, cyclic olefin polymer, polyester, cellulose ester, polyacrylate, polyolefin, polysulfone, and polyurethane.

8. The multilayer optical film of claim 1, wherein the fluoropolymer is poly(α,β,β-trifluorostyrene).

9. The multilayer optical film of claim 1, wherein the second layer comprising the fluoropolymer is made by extrusion of a polymer melt.

10. The multilayer optical film of claim 1, wherein the second layer comprising the fluoropolymer is made by solution cast of a polymer solution.

11. The multilayer optical film of claim 1, wherein the second layer comprising the fluoropolymer is uniaxially or biaxially stretched, which satisfies the relation of $|n_x - n_y| > 0.001$, wherein $n_x$ and $n_y$ are the in-plane refractive indices of the film.

12. The multilayer optical film of claim 1, wherein the second layer comprising the fluoropolymer is laminated on the wave plate.

13. The multilayer optical film of claim 1, wherein the second layer comprising the fluoropolymer is a coating film cast on the wave plate.

14. The multilayer optical film of claim 1, wherein the second layer comprising the fluoropolymer has a thickness of from 3 to 150 μm.

15. The multilayer optical film of claim 13, wherein the second layer comprising the fluoropolymer has a thickness of from 3 to 20 μm.

16. The multilayer optical film of claim 1, whose out-of-plane retardation ($R_{th}$) satisfies the equation of $|R_{th}| < 100$ nm.

17. The multilayer optical film of claim 1, whose out-of-plane retardation ($R_{th}$) satisfies the equation of 30 nm $|R_{th}| < 100$ nm.

18. The multilayer optical film of claim 11, whose out-of-plane retardation ($R_{th}$) satisfies the equation of 30 nm $|R_{th}| < 100$ nm.

19. The multilayer optical film of claim 1, whose out-of-plane retardation ($R_{th}$) satisfies the equation of $|R_{th}| < 30$ nm.

20. The multilayer optical film of claim 11, whose out-of-plane retardation ($R_{th}$) satisfies the equation of $|R_{th}| < 30$ nm.

21. The multilayer optical film of claim 1, whose out-of-plane retardation ($R_e$) of about 120-160 nm at the wavelength (λ) 560 nm.

22. The multilayer optical film of claim 1, whose out-of-plane retardation ($R_e$) of about 120-160 nm at the wavelength ($\lambda$) 560 nm and an out-of-plane retardation ($R_{th}$) that satisfies the equation of $|R_{th}|<30$ nm.

23. The multilayer optical film of claim 1, whose out-of-plane retardation ($R_e$) equal to about $\lambda/4$ at each wavelength ranging from 400 nm to 800 nm.

24. The multilayer optical film of claim 1, whose out-of-plane retardation ($R_e$) equal to about $\kappa/4$ at each wavelength ranging from 400 nm to 800 nm and an out-of-plane retardation ($R_{th}$) that satisfies the equation of $|R_{th}|<30$ nm.

25. A circular polarizer comprising the multilayer optical film of claim 1.

26. A liquid crystal display comprising the multilayer optical film of claim 1.

27. A OLED display comprising the multilayer optical film of claim 1.

* * * * *